United States Patent [19]

Schilling

[11] Patent Number: 4,464,285

[45] Date of Patent: * Aug. 7, 1984

[54] AMPHOTERICS AS EMULSIFIERS FOR BITUMINOUS EMULSIONS

[75] Inventor: Peter Schilling, Charleston, S.C.

[73] Assignee: Westvaco Corporation, New York, N.Y.

[*] Notice: The portion of the term of this patent subsequent to Aug. 7, 2001 has been disclaimed.

[21] Appl. No.: 378,599

[22] Filed: May 17, 1982

[51] Int. Cl.³ .................. B01J 13/00; C09D 3/24; B01F 7/22; B01F 7/28
[52] U.S. Cl. .................. 252/311.5; 106/277; 252/314; 252/356; 252/357
[58] Field of Search ............ 252/311.5, 356, 357; 106/277

[56] References Cited

U.S. PATENT DOCUMENTS

| | | | |
|---|---|---|---|
| 2,550,476 | 4/1951 | Hersberger | 106/277 X |
| 2,966,478 | 12/1960 | Harrison | 260/47 |
| 3,006,860 | 10/1961 | Heinz | 252/311.5 |
| 3,026,266 | 3/1962 | Mertens et al. | 252/311.5 |
| 3,062,829 | 11/1962 | Wright et al. | 252/311.5 |
| 3,096,292 | 7/1963 | Mertens | 252/311.5 |
| 3,097,174 | 7/1963 | Mertens | 252/311.5 |
| 3,123,569 | 3/1964 | Borgfeldt | 252/311.5 |
| 3,220,953 | 11/1965 | Borgfeldt | 252/311.5 |
| 3,230,104 | 1/1966 | Falkenberg et al. | 106/277 |
| 3,324,041 | 6/1967 | Sommer et al. | 252/311.5 |
| 3,344,082 | 9/1967 | Montgomery et al. | 252/311.5 |
| 3,423,221 | 1/1969 | Borgfeldt | 106/277 |
| 3,445,258 | 5/1969 | Ferm et al. | 106/277 |
| 3,466,247 | 9/1969 | Ohtsuka et al. | 252/311.5 |
| 3,518,101 | 6/1970 | Gzemski et al. | 106/277 |
| 3,728,278 | 4/1973 | Tramelli | 252/311.5 |
| 3,738,852 | 6/1973 | Doi et al. | 106/277 |
| 3,753,968 | 8/1973 | Ward | 260/97.6 |
| 3,764,359 | 10/1973 | Dybalski | 106/280 |
| 3,867,162 | 2/1975 | Elste, Jr. | 106/277 |
| 3,899,476 | 8/1975 | Ward | 260/97.5 |
| 3,956,002 | 5/1976 | Moorer | 106/277 |
| 3,957,524 | 5/1976 | Doughty et al. | 106/277 |
| 4,013,601 | 3/1977 | Alford | 260/18 |
| 4,017,419 | 4/1977 | Ludwig et al. | 252/311.5 |
| 4,081,462 | 3/1978 | Powers et al. | 260/501.1 |
| 4,088,505 | 5/1978 | Moorer | 106/277 |

FOREIGN PATENT DOCUMENTS 701860 1/1954 United Kingdom ............ 252/311.5

Primary Examiner—Richard D. Lovering
Attorney, Agent, or Firm—Terry B. McDaniel; Richard L. Schmalz

[57] ABSTRACT

Novel amphoteric emulsifiers for solventless and solvent containing rapid setting and mixing grade, oil-in-water anionic and cationic bituminous emulsions are disclosed which emulsifiers are the reaction products of polyamines and the polycarboxylic acids of the general formulae

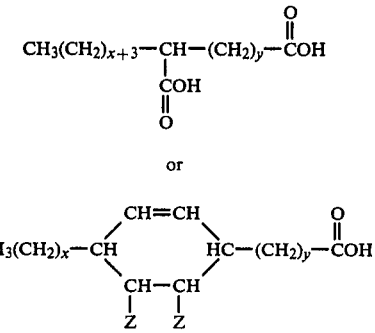

wherein x and y are integers from 3 to 9, x and y together equal 12, at least one Z is a carboxylic acid group and any remaining Z is hydrogen.

19 Claims, No Drawings

AMPHOTERICS AS EMULSIFIERS FOR BITUMINOUS EMULSIONS

BACKGROUND OF THE INVENTION (1) Field of the Invention

This invention relates to medium set mixing grade asphalt emulsions and rapid set emulsions. More particularly, it relates to novel amphoteric emulsifiers for solventless and solvent containing mixing grade, oil-in-water anionic and cationic bituminous emulsions, which emulsifiers are the reaction products of polyamines with certain polycarboxylic acids.

(2) Description of the Prior Art

In having operations, three main practices are employed to achieve thorough mixing of bitumen and aggregate:

(1) mixing of the free flowing heated asphalt (asphalt cement) with pre-dried aggregate;

(2) mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost of energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied.

Generally, depending on the characteristics of the type of mixing and rate of break, bituminous emulsions are classified as rapid setting, medium setting and slow setting. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Anionic bituminous emulsions are taught by Wright and Mertens in U.S. Pat. No. 3,062,829 to be prepared by employing alkali emulsifier and polyamide additives which are the condensation products of dilinoleic acid and polyalkylene polyamines. Lignin amines are taught as anionic emulsifiers in U.S. Pat. No. 3,123,569 to Borgfeldt. Also, Moorer, in U.S. Pat. No. 3,956,002, teaches an anionic emulsifier consisting of an oxygenated alkali lignin, an ethylene oxide adduct of phenol, and up to 10% by weight of sodium borate; and, in U.S. Pat. No. 4,088,505, he teaches an anionic emulsifier consisting of an alkali metal salt of an alkali lignin, an ethylene oxide adduct of phenol and water. In addition, Montgomery and Pitchford teach the alkali metal salts of complex polynuclear aromatic polycarboxylic acids as anionic asphalt emulsifiers in U.S. Pat. No. 3,344,082. Heinz, in U.S. Pat. No. 3,006,860, similarly employs alkali metal soaps of higher fatty acids as those found in tall oil.

Cationic emulsions are obtained by employing a variety of nitrogen containing organic compounds, such as fatty amines, fatty diamines, fatty triamines, fatty amidoamines, fatty imidazolines, fatty mono- and diquaternary ammonium salts, and reaction products of all these compounds with ethylene oxide. The fatty radical of these compounds can have a variety of chemical structures, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Tramelli and U.S. Pat. No. 3,518,101 to Gzemski; fatty quaternary and diquaternary salts and modifications thereof are disclosed in U.S. Pat. No. 3,220,953 to Borgfelt, U.S. Pat. No. 3,867,162 to Elste, U.S. Pat. No. 3,764,359 to Dybalski, U.S. Pat. No. 3,957,524 to Doughty and U.S. Pat. No. 3,466,247 to Ohtsuka, and fatty imidazolines are taught in U.S. Pat. No. 3,445,258 to Ferm.

The most common surface active amphoterics are obtained by reacting tertiary fatty amines with chloroaliphatic acids, chloroalkylsulfonic acids or cyclic lactones or sultones of the same. These compounds are referred to as betaines or Sulfobetaines ®. Compatible with all other classes of surface-active agents, these compounds have uses in cosmetic soap bars, liquid hand soap, soap-based shampoos, germicidal soap preparations, and soap-based laundry preparations.

Generally, asphalt emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increases the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for mixing grade emulsions without using solvent. The use of tallow quaternary ammonium salts and tallow diquaternary diammonium salts for making emulsions suitable for slurry seal, a solventless application, is described in U.S. Pat. No. 3,764,359 to Dybalski, and the use of a quaternary amine obtained by reacting epichlorohydrin, trimethylamine and nonylphenol for solventless mixes is disclosed in U.S. Pat. No. 3,957,524 to Doughty.

The general object of this invention is to provide versatile emulsifiers for solventless and solvent containing rapid setting and medium setting mixing grade, oil-in-water bituminous emulsions. Another object of this invention is to provide emulsifier formulations for mixing grade emulsions which give a variety of set times as expressed in percent initial washoff coating (the percent coat on the aggregate surface after one minute mixing and immediate immersion in water) and percent one hour washoff coating. A further object of this invention is to provide new amphoteric amidoamino-carboxylic acids, prepared as the reaction product of polycarboxylic acids and polyamines, suitable as emulsifiers for both anionic and cationic oil-in-water emulsions.

SUMMARY OF THE INVENTION

It has been found that reaction products of polyamines with certain di- and tricarboxylic acids give emulsions capable of producing anionic and cationic medium set mixing grade asphalt emulsions, as well as rapid set asphalt emulsions. Solventless asphalts as well as asphalts containing up to 15% by volume of a hydrocarbon oil can be used for emulsification.

DESCRIPTION OF THE PREFERRED EMBODIMENTS

The polycarboxylic acids used in the preparation of the invention anionic and cationic emulsifiers are of the following general formulae:

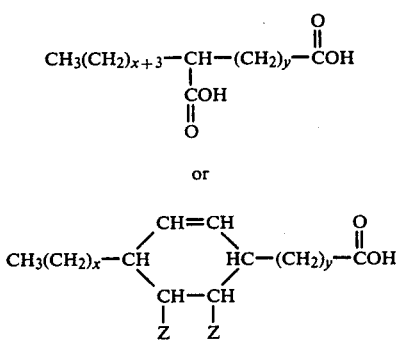

wherein x and y are integers from 3 to 9, x and y together equal 12, at least one Z is a carboxylic acid group and any remaining Z is hydrogen.

These acids are obtained by reaction of carbon monoxide and water with an unsaturated acid, preferably oleic acid, as described by Reppe and Kroper, in Ann 582, 63–65 (1953) in the case of formula I, and by Diels-Alder addition of acrylic, methacrylic, fumaric or maleic acid to polyunsaturated fatty acids with conjugated double bonds in the case of formula II, forming a cyclohexane structure. These acids are referred to as $C_{19}$-dicarboxylic acid, $C_{21}$-dicarboxylic acid and $C_{22}$-tricarboxylic acid. Acids of this type are disclosed in U.S. Pat. Nos. 3,753,968 and 3,899,476 to Ward and U.S. Pat. No. 4,081,462 to Powers et al.

When these acids are heated with a polyamine, a variety of reaction products can be obtained. As a general example, the reaction products of the $C_{21}$-dicarboxylic acid and diethylene triamine are described. By blending two moles of diethylene triamine with one mole of $C_{21}$-dicarboxylic acid, a bis-diethylene diammonium salt is formed of the formula

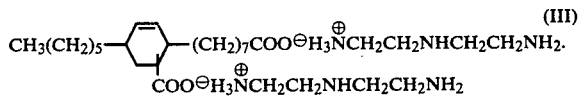

By heating to 180°–200° C. and terminating the reaction after 1 mol water is distilled off the reaction mixture, the monoamidoamine is formed. Because of steric hindrance at the secondary carboxylic group which is directly bound to the cyclohexene ring, amidoamine formation occurs preferably at the primary aliphatic carboxylic group. The monoamidoamine has the formula

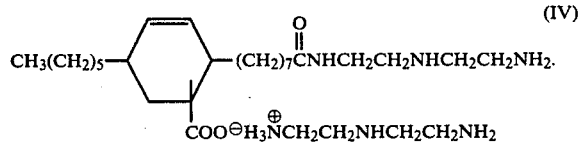

This compound (IV) is an example of an amphoteric compound, since it can be viewed as an ammonium salt of an amino acid. Such compounds are characterized by their solubility at both alkaline and acidic pH values and its low solubility in aqueous systems at their isoelectric point, where the magnitude of positive electric charge equals the magnitude of the negative electric charge on the molecule.

A few of these $C_{21}$-dicarboxylic acid-polyamine reaction products, especially the diimidazolines are reported to be reactive resins and co-reactants with epoxy resins. Ethylene diamine, diethylene triamine, triethylene tetramine and tetra ethylene pentamine are specifically mentioned. Reaction products of $C_{19}$-dicarboxylic acid are disclosed in U.S. Pat. No. 2,966,478 to Harrison, and of $C_{21}$-dicarboxylic acid in British Pat. No. 1,046,208 to Crawford and U.S. Pat. No. 4,013,601 to Alford.

The preferred embodiment of the invention which follows is illustrative of emulsifiers used to obtain asphalt in water emulsions eminently useful for mixing under shear with a variety of siliceous and calcareous aggregates. After setting (evaporation of water), the asphalt films show excellent adhesion to the aggregate surface.

In preparing the bituminous emulsions of this invention, an aqueous soap solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.3–1.5% by weight of the emulsion. Dependent on the emulsifier, a mixing grade cationic emulsion is obtained in a pH range of 2–7, with the optimum performance at a pH of about 4. An anionic mixing grade emulsion, on the other hand, is obtained in a pH range of greater than 7 to 12, with the optimum performance at a pH of about 11.5. In contrast to mixing grade emulsion prepared with tallow quaternary ammonium salts or tallow diquaternary diammonium salts, emulsifiers described in this invention exhibit high viscosity, thus allowing the preparation of suitable emulsions at a lower bitumen to water ratio.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted from solvents (cutback asphalts). Practically any viscosity or penetration graded asphalt cement for use in pavement construction as described in ASTM designation D-3381 and D-946 may be emulsified with the aid of the emulsifiers of this invention.

The acidic soap solutions are normally obtained by suspending the amidoamine in water to which a sufficient amount of a suitable acid, for instance, hydrochloric, sulfuric, and phosphoric acid or the like is added as necessary for the desired pH value of 2–7 and a clear emulsifier solution is obtained. Thereafter, the (acidic or alkaline) soap solution, which is preheated to about 55° C., and the fluid asphalt, which is preheated to 120°–125° C., are mixed under high shear in a colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5–10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are 95% minimum, 50% maximum and 50% minimum, respectively.

The emulsifers of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. In the case of cationic emulsions, one of two methods can be employed. Either a mixture of tall oil fatty acids, preferably tall oil pitch, can be added to the bitumen (asphalt) prior to emulsification to improve break or improve the viscosity of the emulsion, or blends of the above described amidoamines with compatible anionic, cationic, or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Other are fatty monoquaternary ammonium salts and fatty diquaternary diammonium salts and nonionic emulsifiers, such as ethylene glycol polyethers of nonyl- or dodecyl phenol. Combinations of amidoamines, based on fatty monocarboxylic acids of various sources and the $C_{19}$- and $C_{21}$-dicarboxylic acids or $C_{22}$-tricarboxylic acid disclosed in this invention, can also be obtained by reacting suitable polyamines with a blend of fatty monocarboxylic and di- or tricarboxylic acids. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids".

In the case of anionic emulsions, blends of the amphoteric compounds with emulsifiers commonly used for anionic bituminous emulsions can be employed. Examples of such emulsifiers are fatty acids, especially tall oil, rosin acids, lignin isolated from sulfite or kraft pulping lignins, and sulfonic acid-containing surfactants such as aralkylsulfonates, long chain alkylsulfonates and petroleum sulfonates.

Depending on the type of aggregate and its cleanliness, mixing is improved when aggregate is prewetted with 1–5% water by weight of the aggregate. The performance of the asphalt emulsions in regard to mixing characteristics and setting (higher percentage of one-hour washoff coat) can, if necessary, also be improved when, based on the weight of asphalt, 1–15% of a solvent such as diesel oil is added to the asphalt prior to emulsification. The emulsions prepared with the di- and tricarboxylic acid-polyamine condensates disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

The practice of this invention may be seen in the following examples.

EXAMPLE 1

Two hundred (200) grams $C_{21}$-dicarboxylic acid and 100 grams diethylene triamine were placed in a reaction vessel equipped with stirrer, reflux condenser and a Dean-Stark trap to collect distillate. The temperature was slowly raised to 180° C. and the reaction was terminated after 15 mL distillate (water and some amine) was collected.

EXAMPLE 2

This example illustrates the properties of cationic emulsions obtained when the emulsifier of Example 1 was used for emulsification. To show the versatility of the emulsion, various siliceous and calcareous aggregates were used for the mixing experiments. The emulsion was prepared with Venezuelan asphalt, having a penetration value of 120–150. An excellent emulsion was obtained when 0.8% emulsifier dosage was used. The emulsion was prepared at a pH of 2.5. The pH adjustments were made with dilute hydrochloric acid. The test data are given in Table I. The aggregate test indicates whether an emulsion is suitable for mixing operations. It was carried out with mixing bowl and spoon. Depending on the cleanliness of the aggregate, it was prewetted with 1–3% water prior to addition of the emulsion. After 5–9 grams emulsion (per 100 grams of aggregate) was mixed with aggregate for one minute, initial coating, initial washoff coating, and one hour washoff coating were determined visually. From these data, the mixing efficiency and set time with a specific aggregate can be determined.

TABLE I

| EVALUATION OF CATIONIC ASPHALT EMULSIONS | | | | | |
|---|---|---|---|---|---|
| % Asphalt Content | Saybolt Furol Viscosity @ 50° C. (sec.) | % Initial Coating | % Initial Washoff Coating | % 1 Hour Washoff Coating | Aggregate |
| 68.7 | 180 | 100 | 5 | 85 | Big Sandy |
| | | 90 | 70 | 90 | Good Hope |
| | | 100 | 10 | 100 | Schloss |

The data from Table I show excellent coating characteristics for all aggregate types tested.

EXAMPLE 3

This example illustrates the performance of an anionic asphalt emulsion prepared with 1% dosage of the emulsifier of Example 1 at pH 11.5 and mixed for one minute with various aggregates. The results are shown in Table II.

TABLE II
EVALUATION OF ANIONIC EMULSION PREPARED WITH AMPHOTERIC EMULSIFIER

| % Asphalt Content | Saybolt Furol Viscosity @ 50° C. (sec.) | % Initial Coating | % Initial Wash-off Coating | % 30 Min. Wash-off Coating | % 1 Hour Wash-off Coating | Aggregate |
|---|---|---|---|---|---|---|
| 67.3 | 203 | 100 | 2 | 100 | 100 | Rhyolite |
| | | 100 | 2 | 80 | 100 | Tennessee Limestone |
| | | 100 | 10 | 100 | 100 | Tennessee River Gravel |
| | | 100 | 10 | 70 | 100 | Granite |
| | | 100 | 10 | 95 | 100 | Schloss |

Excellent coating characteristics are shown for all aggregate types tested.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Amphoteric emulsifiers for anionic and cationic bituminous emulsions consisting of reaction products of polyamines reacted with polycarboxylic acids corresponding to the formulae

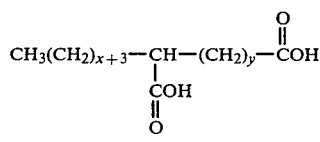

and

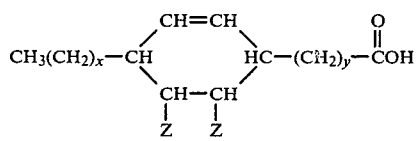

wherein x and y are integers from 3 to 9, x and y together equal 12, at least one Z is a carboxylic acid group and any remaining Z is hydrogen.

2. The amphoteric emulsifier of claim 1 wherein the polyamine is diethylene triamine and the polycarboxylic acid is $C_{21}$-dicarboxylic acid corresponding to the formula

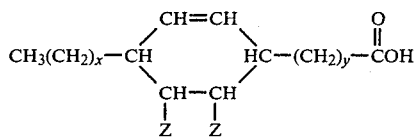

wherein x and y are integers from 3 to 9, x and y together equal 12, one Z is a carboxylic acid group and the remaining Z is hydrogen.

3. The method of preparing the amphoteric emulsifier of claim 2 wherein a molar ratio of two moles diethylene triamine and one mole of $C_{21}$-dicarboxylic acid is blended, refluxed to a temperature of from 180° C. to 200° C., and distillate is collected.

4. An amphoteric emulsifier for anionic and cationic bituminous emulsions corresponding to the formula

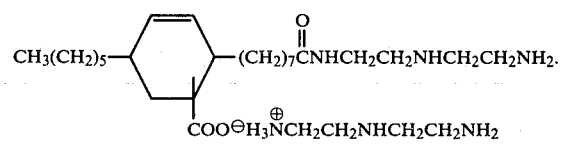

5. A bituminous emulsion comprising from about 30% to about 80% by weight of bitumen, from about 0.1% to about 10% by weight of an amphoteric emulsifier selected from the group consisting of amphoteric reaction products of polyamines reacted with polycarboxylic acids corresponding to the formulae

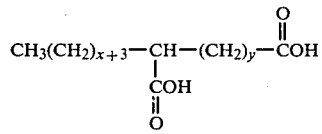

and

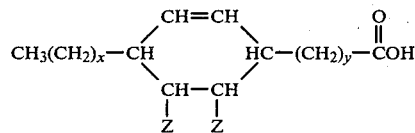

wherein x and y are integers from 3 to 9, x and y together equal 12, at least one Z is a carboxylic acid group and any remaining Z is hydrogen, and water to make up 100% by weight, the emulsion having a pH in the range of from 2 to 12.

6. The bituminous emulsion of claim 5 wherein the emulsion is a mixing grade composition.

7. The bituminous emulsion of claim 5 comprising from about 60% to 70% bitumen by weight of the emulsion, from about 0.3% to 1.5% emulsifier by weight of the emulsion, and water to make up 100% by weight.

8. The bituminous emulsion of claim 5 including up to 90% of the total emulsifier formulation of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

9. The bituminous emulsion of claim 5 including up to 90% of the total emulsifier formulation of one or more auxiliary emulsifiers selected from the group consisting of nitrogen derivatives of resin acids and nitrogen derivatives of kraft lignin.

10. The bituminous emulsion of claim 5 wherein the emulsifier formulation is prepared by reacting the polyamine with the polycarboxylic acid of claim 5 and a blend of acids selected from the group of fatty monocarboxylic acids and dimer acids.

11. The bituminous emulsion of claim 5 wherein the emulsifier formulation is prepared by reacting a polyamine with a blend of resin acids and the polycarboxylic acid of claim 5.

12. The bituminous emulsion of claim 5 wherein the emulsifier formulation is prepared by reacting the polyamine with a blend of kraft lignin and the polycarboxylic acid of claim 5.

13. The bituminous emulsion of claim 5 wherein the emulsion includes from 1% to 15% by volume of a hydrocarbon oil.

14. The bituminous emulsion of claim 5 wherein a mixture of tall oil fatty acids is added to the bitumen prior to emulsification.

15. The bituminous emulsion of claim 14 wherein the tall oil fatty acids mixture is tall oil pitch.

16. The bituminous emulsion of claim 5, 6, 7, 8, 9, 10, 11, 14 or 15 wherein the emulsion is anionic and the pH is in the range of from greater than 7 to 12.

17. The bituminous emulsion of claim 16 wherein the pH is about 11.5.

18. The bituminous emulsion of claim 5, 6, 7, 8, 9, 10, 11, 14 or 15 wherein the emulsion is cationic and the pH is in the range of from 2 to 7.

19. The bituminous emulsion of claim 18 wherein the pH is about 4.

* * * * *